Figure 1:
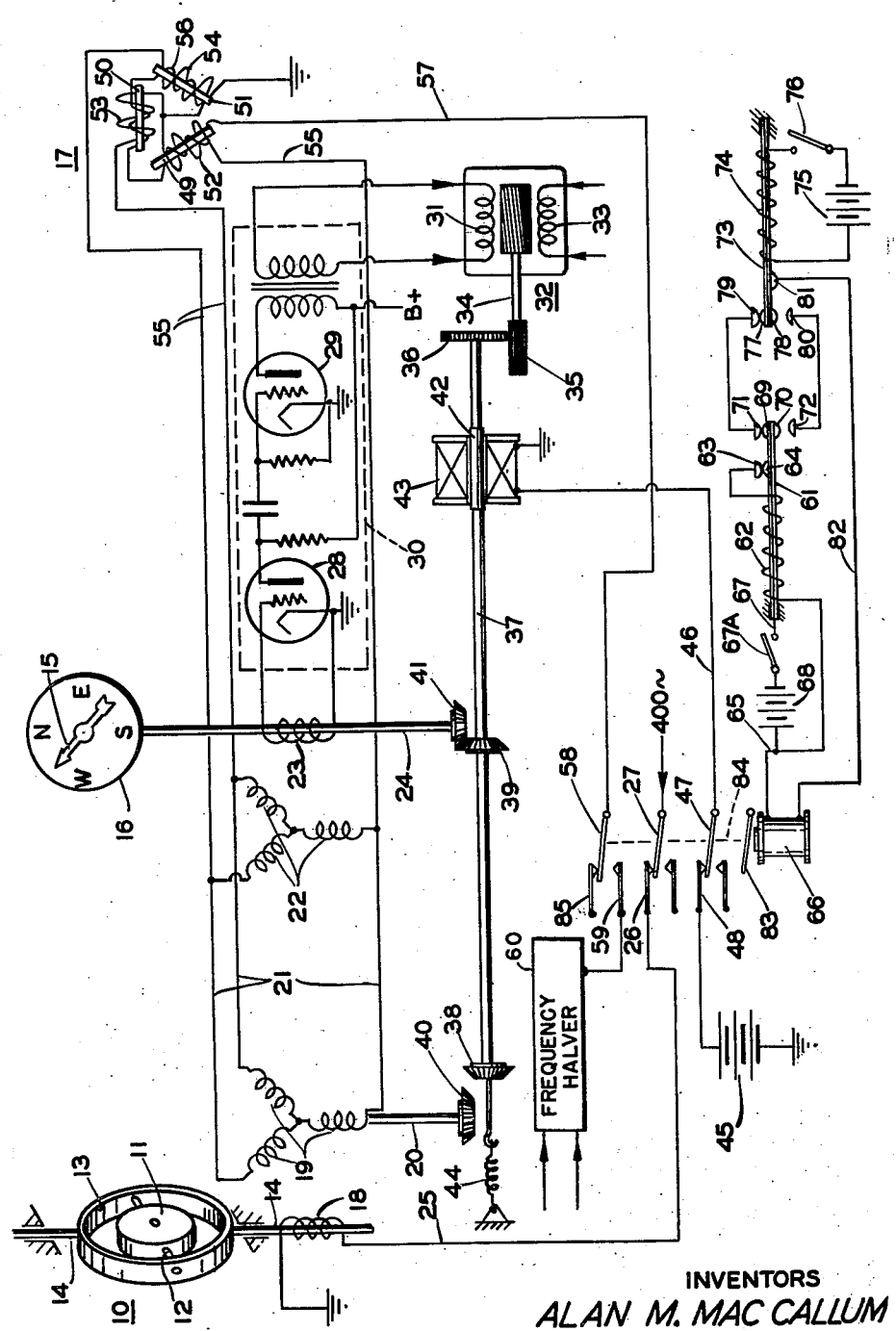

Sept. 23, 1952  A. M. MacCALLUM ET AL  2,611,190
NAVIGATION SYSTEM
Filed Jan. 5, 1949  2 SHEETS—SHEET 1

INVENTORS
ALAN M. MACCALLUM
SABINE L. BARING-GOULD
BY
ATTORNEY

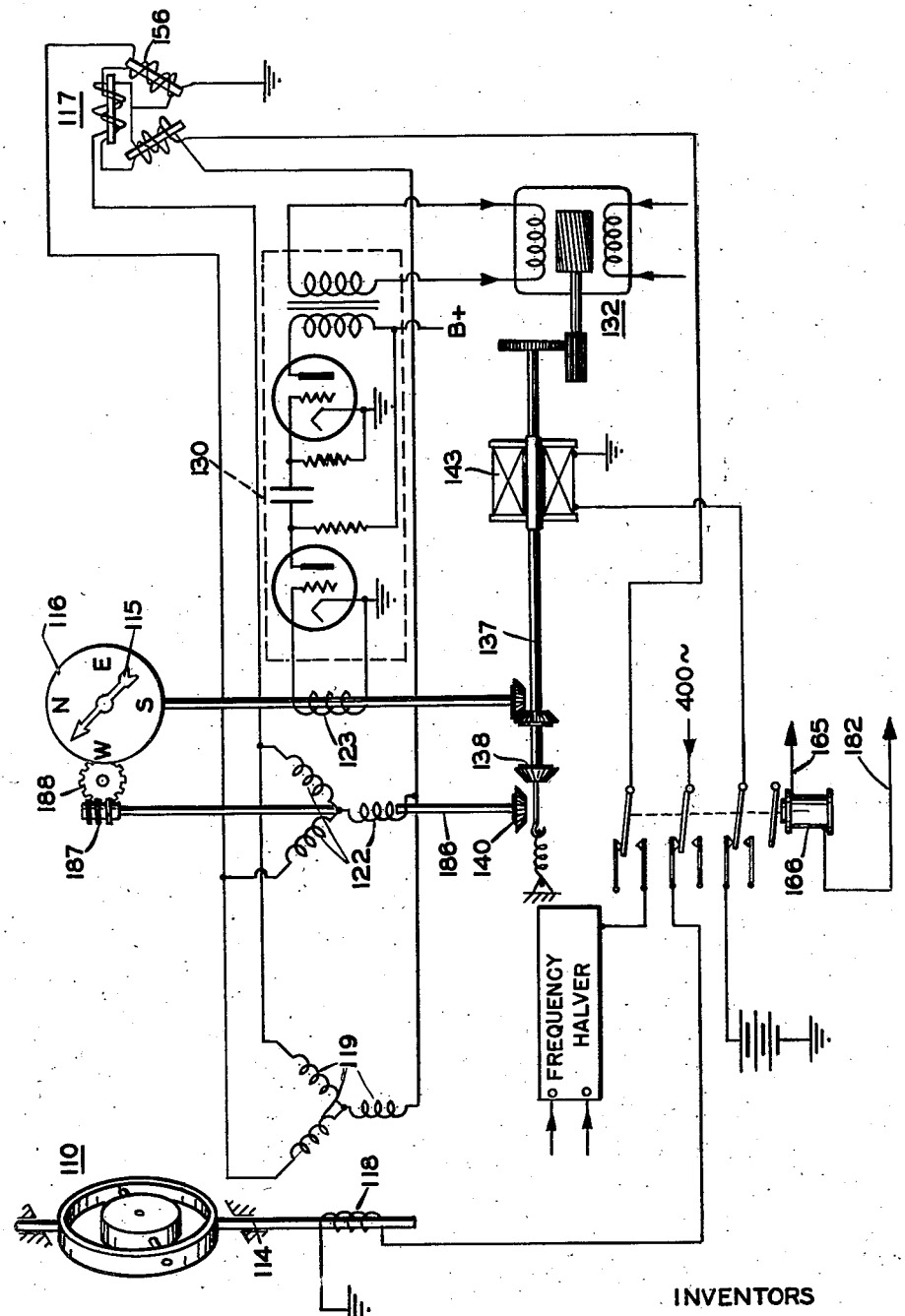

Patented Sept. 23, 1952

2,611,190

UNITED STATES PATENT OFFICE 2,611,190

NAVIGATION SYSTEM

Alan M. MacCallum, Maywood, N. J., and Sabine L. Baring-Gould, New York, N. Y., assignors to Bendix Aviation Corporation, Teterboro, N. J., a corporation of Delaware Application January 5, 1949, Serial No. 69,388

15 Claims. (Cl. 33—222)

This invention generally relates to navigation systems for mobile craft such as aircraft, for example, and more particularly constitutes an improvement over the direction indicating and/or maintaining means described and claimed in copending application Serial No. 61,343, filed November 22, 1948, and assigned to the assignee of the present application.

Where the arrangement of the above mentioned copending application requires two torque amplifier systems for correcting a directional gyroscope for errors due to wandering of the gyro without precessing the gyro, the arrangement of the present invention requires but a single torque amplifier system for accomplishing substantially the same result in a simpler manner, thereby materially reducing the weight as well as the cost of the entire arrangement.

An object of the present invention, therefore, is to provide a novel compass or reference system utilizing a free directional gyroscope for use with mobile craft.

Another object of the invention is to provide a novel navigation system for mobile craft utilizing a directional gyroscope in which the azimuth information provided by the gyro is corrected by a reference provided by the earth's magnetic field or any other suitable reference in azimuth.

A further object is to provide a novel compass system for mobile craft comprising both a magnetic compass and a directional gyroscope combined in a novel and simple manner.

Another object is to provide a novel direction indicating and/or maintaining means utilizing a directional gyroscope in which the conventional requirement for corrective precession on the gyro has been eliminated, thereby eliminating the need for precessing expedients which have been heretofore required on the gyro rotor.

A still further object is to provide a novel compass system comprising a magnetic compass and a directional gyroscope together with a single torque amplifier which is energized alternately by the compass and the gyro to operate a desired controlled member such as an indicator, an automatic pilot system or for stabilizing in azimuth of any other desired device or apparatus.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts in both views;

Figure 1 is a diagrammatic illustration of the novel navigation system of the present invention; and Figure 2 is a view, similar to Figure 1, of a modified form of the invention.

Referring now to the drawings for a more detailed description of the present invention and more particularly to Figure 1 thereof, a conventional three-degree-of-freedom directional gyroscope 10 is shown having a rotor 11, provided with a horizontal spin axis, which is mounted by way of minor horizontal trunnions 12 within a gimbal 13, the latter being provided with vertical trunnions 14 mounting the gyro within a suitable casing (not shown). Inasmuch as a gyro of this character will maintain a fixed reference in space, it is connected, in a manner to presently appear, to indicating means such as a pointer 15 which is movably mounted relative to a dial 16 having a compass scale thereon, the dial being fixed to the craft.

As is well known, pointer 15 is stabilized in azimuth by the directional gyro so that any departure by the craft from a prescribed course will be manifested by relative motion of the dial and pointer. Due to bearing friction and other causes, however, the gyro is subject to wandering which, if uncorrected, would lead to erroneous course indication. A novel monitoring system is provided, therefore, in the form of an earth inductor device 17 which, in accordance with the present invention, will periodically correct pointer position and thereby correct for gyro wandering if such has occurred without precessing the gyro, i. e., the gyro is free of conventional precessing expedients and permitted to wander at will but pointer displacement due to gyro wandering is corrected.

Pointer 15 is primarily under the control of gyro 10 and for this purpose one of trunnions 14 of the latter supports, for movement therewith, a wound rotor 18 of a variable inductive device having a wound stator 19, the latter being movably supported by a suitably journalled shaft 20. Stator 19 is connected by way of leads 21 to a second wound stator 22, which is fixed with respect to the craft, of a coordinating inductive device having a wound rotor 23 mounted on a movable shaft 24 which also mounts pointer 15 thereon.

Rotor winding 18 is grounded at one end as shown and at its other end is connected by way of a lead 25, a fixed contact 26 and a movable contact 27 with a suitable source of alternating current (not shown). With rotor 18 energized, signals will appear in stator windings 19 which will be communicated to stator windings 22. If the electrical axis of rotor 23 is in some position other than normal with respect to the resultant flux vector at stator 22, a signal will be induced within rotor 23 which will be communicated to a voltage amplifier tube 28 and a power amplifier tube 29 of a conventional amplifier 30 to energize the variable phase winding 31, the phase of the energizing current depending upon the phase of the signal induced within rotor 23, of a two phase induction motor 32 whose fixed phase winding 33 is energized from a suitable source of current (not shown).

Motor 32 is provided with a shaft 34 carrying a pinion 35 thereon which meshes with a gear 36 supported on an axially slidable shaft 37. Shaft 37 supports a pair of spaced bevel gears 38 and 39 thereon, the former being adapted for driving engagement with a bevel gear 40 carried on shaft 29 and the latter for engagement with a bevel gear 41 carried by shaft 24.

Shaft 37 also mounts a core 42 of a solenoid 43 thereon, the solenoid, when energized, drawing shaft 37 to the right against the action of a spring 44 which normally urges the shaft to the left. Solenoid 43 is arranged to be energized at the time that rotor winding 18 is energized and has one side thereof grounded, the other side thereof connecting with a battery 45 by way of a lead 46, a movable contact 47 and a fixed contact 48. Energization of the solenoid causes gear 38 to disengage gear 40 and gear 39 to engage gear 41 so that motor 32 will drive rotor 23 to a null relative to its stator 22 at which time the signal of the rotor drops to zero to de-energize the motor. In this manner pointer 15 is positioned relative to dial 16 by the directional gyro.

Since it will now be apparent that pointer 15 is subject to any gyro wandering, the monitoring system including the earth inductor device 17 is provided, in accordance with the present invention, for correcting pointer movement due to such wandering. Device 17 generally consists of three laminations 49, 50 and 51 arranged in triangular relation, each lamination supporting a secondary winding 52, 53 and 54 thereon, like ends of each winding being connected at a common midpoint and the opposite ends of each winding connecting by way of leads 55 with stator 22 of the coordinating inductive device. An energizing winding 56 is carried by the laminations, one end of the latter winding being grounded and the opposite end thereof connecting by way of a lead 57, a movable contact 58 and a fixed contact 59 with a conventional frequency halver 60, the purpose of which will presently appear.

As is well known with the use of such devices, inductive device 17 may be pendulously mounted or gyro stabilized in the earth's magnetic field and, as a result of relative displacement of the device and the field, signals will appear at the secondaries proportional to the angular displacement of the laminations with respect to the field. The signals at the output of the secondaries are at a frequency double the frequency of the current in the energizing winding and in order that the frequencies at stator windings 19 and the secondary windings of device 17 will be the same, so that the frequencies of the current supplied to variable phase 31 of motor 32 will be the same, the frequency halver 60 is utilized between energizing winding 56 and the source of current for energizing rotor winding 18. If, for example, a 400 cycle supply is associated with movable contact 27, a 200 cycle supply will be available at fixed contact 59.

Assuming now a condition in which movable contact 58 is in engagement with fixed contact 59 and movable contact 47 is out of engagement with fixed contact 48, solenoid 43 will be de-energized so that spring 44 will urge bevel gear 38 into engagement with bevel gear 40 and disengage bevel gear 39 from gear 41, and the output of frequency halver 60 will energize primary winding 56 of inductive device 17. Depending upon the angular disposition of device 17 in the earth's magnetic field, signals will be developed at secondaries 52, 53 and 54 which are communicated to stator windings 22 by way of leads 55. Where the positions of both the directional gyro and inductive device 17 are the same (both positioned due north, for example), rotor winding 23 will be normal to the resultant flux vector at stator 22 resulting from energization of either rotor winding 18 or primary winding 56 of device 17 so that the entire system is synchronized.

If, on the other hand, rotor 23, previously positioned by gyro 10, is at some position other than normal relative to the resultant flux vector at stator 22 due to energization of primary winding 56, a signal will be induced therein and amplified within amplifier 30 to energize motor 30 which, under this condition, will displace stator 19 relative to its rotor 18, the latter being de-energized at this time. The presence of a signal in rotor 23 indicates that the system is out of synchronism and the object of displacing stator 19 relative to its rotor 18 is to so position the latter stator that upon energization of rotor 18 the flux vector at stator 22 due to energization of rotor 18 or primary winding 56 will be the same thereby re-establishing the synchronized condition of the system. Positioning of stator 19 in this manner to a null position is not necessarily accomplished automatically during a single period of control by the earth inductor but the initial movement of the stator is such as to reduce the error signal, the time required for positioning the stator in the null position being determined by the amount of the error signal as well as the selection of the period of control by the earth inductor. If displacement of stator 19 by motor 32 has been other than that necessary to re-establish the synchronized condition of the system, a signal will again appear at rotor 23, after primary winding 56 has been de-energized and solenoid 43 and rotor 18 have been energized with gears 38 and 40 disengaged and gears 39 and 41 re-engaged. Such signal again energizes motor 32 to drive rotor 23 in the direction which is initially towards a null. Thereafter, rotor 18 is again de-energized and primary winding 56 is energized while solenoid 43 is de-energized, the foregoing steps being repeated until, with either rotor 18 or winding 56 energized, no signal will appear at rotor 23.

During normal operation of the system for direction indication and/or maintenance it is desirable to maintain rotor winding 18 and solenoid 43 energized for a period of time longer than the time that winding 56 is energized and solenoid 43 de-energized. As a result, during normal operation, pointer 15 is under primary control by the gyro, the monitoring control being provided for only short periods of time. On the other hand, where there is initially a wide divergence between the gyro and device 17 and it is desired to synchronize the system prior to normal operation thereof, it is desirable to maintain winding 56 energized for a period of time longer than that during which rotor 18 is energized.

The means for alternately pulsing or energizing rotor winding 18 of gyro 10 or primary winding 56 of inductive device 17 may take any form and as shown in Figure 1 may comprise a bimetallic element 61 having a heating coil 62 wound thereon, one end of the coil being connected to a fixed contact 63 adapted for cooperation with a contact 64 carried by the element and the opposite end of the coil being connected by way of a lead 65 with one side of a relay 66. The fixed end of element 61 is connected by way of a lead 67 and a switch 67a with one side of a battery 68, the opposite side of the battery being tapped to lead 65, and the movable end of the element is provided with an upper and a lower contact 69 and 70, the former for cooperation with a fixed contact 71 and the latter for cooperation with a fixed contact 72.

A reversing mechanism, whereby primary winding 56 of device 17 may be initially energized for synchronization purposes for a period of time longer than that under which rotor 18 is energized, is provided in the form of a second bimetallic element 73 having a heating coil 74 wound thereon, one end of the coil being connected with one side of a battery 75 and the other end of the coil being adapted for connection with the opposite side of the battery by way of a switch 76. The movable end of element 73 is provided with an upper and lower contact 77 and 78, the former cooperating with a fixed contact 79 connected with fixed contact 71 and the latter cooperating with a fixed contact 80 connected with fixed contact 72. Closely adjacent contacts 77 and 78 on element 73 is a further contact 81 which connects by way of a lead 82 with the opposite side of relay 66.

Assuming a wide divergence between the directional gyro and inductive device 17, synchronization leading to normal operation of the system is obtained by closing switches 76 and 67a whereupon current flows in both heating coils 62 and 74 and relay 66 is simultaneously energized by battery 68. Upon energization of the relay, an armature 83 is pulled downwardly drawing movable contacts 27, 47 and 58 therewith which are connected thereto by a common member 84. As a result, contacts 58, 59 are engaged to energize primary winding 56 of device 17 and contact 47 is disengaged from contact 48 to de-energize solenoid 43 whereby gears 38 and 40 are engaged and gears 39 and 41 are disengaged. Under this condition, stator 19 is displaced by the signal developed in rotor 23 by the output of device 17 connected to stator 22.

Bimetallic element 61 and its heating coil 62 acts as a thermo-pulser while bimetallic element 73 and its heating coil 74 acts as a delay device. Initially, with switches 76 and 67a closed, contacts 77 and 79 of the delay device and contacts 69 and 71 of the pulser are engaged so that primary winding 56 is energized. At the same time that contacts 69 and 71 of the pulser are closed, contacts 63 and 64 thereof are also closed so that coil 62 heats up and after a predetermined interval of time element 61 bends about its fixed end to disengage contacts 69 and 64 from their related contacts 71 and 63 as a result of which relay 66 becomes de-energized so that its movable contacts 27, 47 and 58 engage with fixed contacts 26, 48 and an open contact 85. In this manner primary winding 56 is de-energized and both solenoid 43 and rotor 18 are energized so that the gyro drives rotor 23 to a null if it has not yet attained that position. At the same time, coil 62 cools off to permit element 61 to assume its original position to again close contacts 69, 71 and 63, 64 to energize relay 66 and thus disconnect the gyro from the system and place the latter under the control of device 17. Inasmuch as contacts 77, 79 of the delay device are in engagement at this time, pointer 15 is under control of inductive device 17 for a longer period of time than it is under the control of the gyro. This results from the fact that it takes element 61 a longer period of time to heat up than it does for it to cool off.

After a predetermined interval of time has lapsed, coil 74 will have heated bimetal element 73 sufficiently to cause the latter to bend about its fixed end to disengage contacts 77, 79 and engage contacts 78, 80. Once element 73 has bent downwardly it remains in such position for so long as the system operates. With contacts 78, 80 engaged, the pulsing cycle is reversed so that rotor 18 of the gyro as well as solenoid 43 are energized for a period of time longer than that under which winding 56 is energized and the solenoid de-energized. This occurs because when element 61 is in the position shown contacts 63, 64 are engaged and place coil 62 across battery 68 whereupon the element heats up and bends downwardly to disengage contacts 63, 64 to de-energize the coil and engage contacts 70, 72 to energize relay 66 at which time control by device 17 is inserted into the system and control by the gyro is removed from the system. Because of its cooling off, element 61 bends upwardly to re-engage contacts 63, 64 and de-energize the relay to insert gyro control into the system and disconnect control by device 17. The period during which relay 66 is energized is shorter than the period during which it is de-energized so that gyro control of the system occurs a major portion of the time.

In the foregoing manner the entire system is synchronized through coordinating device 22—23, which alternately compares the position of the gyro and inductive device 17. Thereafter, when any wandering of the gyro occurs the signals induced within stator 19, due to relative movement of rotor 18, will be communicated to stator 22 where the resultant flux vector will be displaced relative to rotor 23 to thereby disturb the synchronized relation of the system. At such time, due to the signal induced therein, rotor 23 will be driven to a new null relative to its stator and during the next cycle, when device 17 is energized and rotor 18 de-energized, stator 19 will be displaced relative to its rotor so that during the following cycle, when rotor 18 is again re-energized and device 17 de-energized, the flux vector at stator 22 will again be displaced relative to rotor 23 in an opposite direction to induce a signal in the latter whereupon rotor 23 will be driven to its original null position. In this manner even though the gyro wanders, the pointer or any other member controlled by shaft 24, due to monitoring action of device 17 maintains a fixed reference position in azimuth.

With the form of the invention of Figure 1, above described, the dial and pointer arrangement is adapted for location within the casing of directional gyro 10. It may, however, be desirable to have the indicating means or other controlled member located remotely from the directional gyro and to this end the system of Figure 2 is provided in which parts having counterparts in Figure 1 are designated with the same reference characters plus 100. In this latter form of the invention, stator 119 is fixed relative to movable rotor 118 supported by trunnion 114 of gyro 110 and stator 122 of the coordinating device is mounted by way of a shaft 186 for angular displacement relative to its rotor 123. Inasmuch as stator 122 is displaceable in this form of the invention, one end of shaft 186 is provided with a pinion 187 which drives dial 116 therewith through a gear 188. In this manner a desired fixed relation of the dial relative to the stator of the coordinating device is maintained. The opposite end of shaft 186 carries the bevel gear 140 which under certain conditions is adapted for drivable engagement with bevel gears 138 carried by shaft 137.

Except for the changes noted above, the system of Figure 2 is the same as that of Figure 1 and operates in substantially the same manner. Relay 166 is connected by way of leads 165 and 182 to the thermo-pulser and the delay device of Figure 1. Upon closure of switches 67a and 76 the entire system, as before, is initially under longer control by device 117 than it is by gyro 110. Once the delay device operates to disengage contacts 77, 79 the cycle is reversed so that primary control of the system is effected by the gyro with monitoring action by device 117.

When the cycle is of such nature that both rotor 118 and solenoid 143 are energized and some discrepancy in the position of the directional gyro and device 117 has occurred, a signal will be induced within rotor 123 which is amplified within amplifier 130 to actuate motor 132. The motor thereupon drives rotor 123 to a null and displaces pointer 115 therewith. Pointer position thus is made to correspond with gyro position. As the next cycle occurs, rotor 118 becomes de-energized as does solenoid 143 and winding 156 of device 117 becomes energized. Inasmuch as the pointer has been moved from its fixed reference position in azimuth, the flux vector at stator 122 will be displaced to some position other than normal relative to rotor 123 so that a signal is induced in the latter to energize motor 132 which, under this condition, because gears 138 and 140 are now engaged, will displace both stator 122 and dial 116, motion of the stator and the dial continuing until the flux vector at stator 122 is brought to a normal relation with respect to rotor 123. For each displacement of the pointer relative to the dial due to wandering of the gyro the system is so monitored by device 117 that the dial, in turn, is displaced relative to the pointer. Thus the pointer relative to the dial maintains a fixed reference position in azimuth as desired even though the gyro is permitted to wander at will.

While the coordinating device of both forms of the invention is shown as operating indicating means it can equally as well control an automatic pilot system, for example, by providing a reference signal therefor in which case a further inductive device would be provided so that its rotor would be displaceable by shaft 24 of Figure 1. In the form of the invention of Figure 2, such inductive device would have its rotor movable by the shaft supporting rotor 123 and its stator movable by shaft 186.

While the reference providing means for the monitoring system is shown as comprising a pendulously mounted or gyro stabilized earth inductor device 17 it could equally as well be a damped magnetic compass with an inductor device disposed in the magnetic field of the needle of the compass.

Although but two embodiments of the invention have been illustrated and described in detail it is to be expressly understood that the invention is not limited thereto. Various changes may be made in the design and arrangement of the parts without departing from the spirit and scope of the invention as the same will now be understood by those skilled in the art.

We claim:

1. Means comprising a controlled device for maintaining a fixed reference position in azimuth, coordinating means for operating said controlled device, means comprising a directional gyro for energizing said coordinating means, reference means comprising an earth inductor device for energizing said coordinating means for correcting said controlled device for wandering of said gyro, and periodically operable means for alternately connecting said directional gyro to said coordinating means and energizing said reference means.

2. Means comprising a controlled device for maintaining a fixed reference position in azimuth, coordinating means comprising a two-part inductive device for operating said controlled device, a directional gyro, an electrical pick-off operable by said gyro, said pick-off when energized controlling said coordinating means, reference means which when energized controls said coordinating means for correcting said controlled device for wandering of said gyro, and means for alternately energizing said pick-off means and said last-named reference means.

3. A navigation system comprising controlled means for maintaining a fixed reference position in azimuth, a directional gyro, means comprising an electrical pick-off operable by said gyro, said pick-off when energized operating said controlled means, reference means which when energized operates said controlled means to correct the latter for errors due to wandering of the gyro, and means for alternately energizing said pick-off means and said last-named reference means.

4. Direction indicating means comprising relatively movable pointer and dial elements, a coordinating device connected for operating at least one of said elements, means comprising a directional gyro for controlling said coordinating device, reference means comprising an earth inductor device for controlling said coordinating device to correct for errors due to wandering of the gyro, and periodically operable means for subjecting said coordinating device to alternate control by said reference means and said directional gyro.

5. Direction indicating means comprising a relatively movable pointer and dial, a coordinating device connected for moving said pointer, means comprising a directional gyro for controlling said coordinating device, reference means comprising an earth inductor device for controlling said coordinating device to correct for errors due to wandering of the gyro, and intermittently operable means for subjecting said coordinating device to alternate control by said directional gyro and said reference means.

6. Direction indicating means comprising a relatively movable pointer and dial, a coordinating device connected for moving said pointer and dial, means comprising a directional gyro for controlling said coordinating device, reference means comprising an earth inductor device for controlling said coordinating device to correct for errors due to wandering of the gyro, and intermittently operable means for subjecting said coordinating device to alternate control by said directional gyro and said reference means.

7. In combination with controlled means for maintaining a fixed reference position in azimuth, means comprising a directional gyro, reference means comprising an earth inductor device, and cyclically operable means subjecting said controlled means to alternate control by said directional gyro and said reference means.

8. In combination with a controlled member for maintaining a fixed reference position in azimuth, coordinating means for operating said controlled member, means comprising a directional gyro, reference means comprising an earth inductor device, and cyclically operable means subjecting said coordinating means to alternate control by said directional gyro and said reference means.

9. Direction indicating means comprising relatively movable pointer and dial elements, a coordinating device connected for operating at least one of said elements, a directional gyro, means comprising an electrical pick-off operable by said gyro, said pick-off when energized operating said coordinating device, reference means which when energized operate said coordinating device to correct the latter for errors due to wandering of the gyro, and means for alternately energizing said pick-off means and said reference means.

10. Direction indicating means comprising relatively movable pointer and dial elements, coordinating means comprising a two-part inductive device for operating at least one of said elements, a directional gyro, means comprising an electrical pick-off device connected to said inductive device operable by said gyro, said pick-off device when energized operating said coordinating means, reference means connected to one of said devices, said reference means when energized operating said coordinating means to correct for errors due to wandering of the gyro, and means for alternately energizing said pick-off device and said reference means.

11. A navigation system for a mobile craft comprising controlled means for maintaining a fixed reference position in azimuth, coordinating means for operating said controlled means, a directional gyro adapted for connection to and disconnection from said coordinating means, said directional gyro when connected to said coordinating means influencing the latter whereby said controlled means is operated during craft deviation from a prescribed course, reference means comprising a stationary earth inductor device fixed on said craft and connected to said coordinating means and adapted for energization and de-energization, said reference means when energized correcting said controlled means for wandering of said gyro, and means for alternately connecting said directional gyro with said coordinating means and energizing said reference means.

12. A navigation system for a mobile craft comprising controlled means for maintaining a fixed reference position in azimuth, coordinating means for operating said controlled means, a directional gyro adapted for connection to and disconnection from said coordinating means, said directional gyro when connected to said coordinating means influencing the latter whereby said controlled means is operated during craft deviation from a prescribed course, reference means comprising a stationary earth inductor fixed on said craft and connected to said coordinating means and adapted for energization and de-energization, said reference means when energized correcting said controlled means for wandering of said gyro, and means for alternately connecting said directional gyro to said coordinating means and for de-energizing the reference means during one interval of time and for disconnecting the directional gyro from said coordinating means and for energizing said reference means during a second interval of time.

13. In combination with controlled means for maintaining a fixed reference position in azimuth, means comprising a directional gyro, reference means comprising an earth inductor device, cyclically operable means subjecting said controlled means to alternate control by said directional gyro and said reference means, and means operatively connected with said cyclically operable means and effective after a predetermined interval of time to modify operation of said cyclically operable means whereby said controlled means is under the control of said directional gyro for a longer period of time than it is under the control of said reference means.

14. In combination with controlled means for maintaining a fixed reference position in azimuth, means comprising a directional gyro, reference means comprising an earth inductor device, cyclically operable means subjecting said controlled means to alternate control by said directional gyro and said reference means, and means operatively connected with said cyclically operable means and effective during a predetermined interval of time to modify operation of said cyclically operable means whereby said controlled means is under the control of said reference means for a longer period of time than it is under the control of said directional gyro.

15. In combination with controlled means for maintaining a fixed reference position in azimuth, means comprising a directional gyro, reference means comprising an earth inductor device, periodically operable means subjecting said controlled means to alternate control by said directional gyro and said reference means, and means connected with said periodically operable means and effective during a predetermined interval of time for controlling the operation of said periodically operable means whereby said controlled means is under the primary control of said reference means and effective following the predetermined interval of time for modifying the operation of said periodically operable means whereby said controlled means is under the primary control of said directional gyro.

ALAN M. MacCALLUM.
SABINE L. BARING-GOULD.

REFERENCES CITED

The following references are of record in the file of this patent:

UNITED STATES PATENTS

| Number | Name | Date |
|---|---|---|
| 2,014,024 | Leatherman | Sept. 10, 1935 |
| 2,076,328 | Wade et al. | Apr. 6, 1937 |
| 2,108,263 | L'Abee-Lund | Feb. 15, 1938 |
| 2,357,319 | Esval et al. | Sept. 5, 1944 |
| 2,414,128 | Sinks | Jan. 14, 1947 |

FOREIGN PATENTS

| Number | Country | Date |
|---|---|---|
| 49,251 | France | Nov. 12, 1938 |

(Addition to No. 793,301)